United States Patent [19]
Samulski et al.

[11] Patent Number: 5,266,677
[45] Date of Patent: Nov. 30, 1993

[54] THIOPHENE-BASED POLYMERS

[75] Inventors: Edward T. Samulski; Joseph M. DeSimone, both of Chapel Hill, N.C.

[73] Assignee: University of North Carolina at Chapel Hill, Chapel Hill, N.C.

[21] Appl. No.: 888,921

[22] Filed: May 27, 1992

[51] Int. Cl.$^5$ .................. C08G 75/00; C08G 73/10; C08G 69/00

[52] U.S. Cl. .................. 528/310; 528/312; 528/313; 528/321; 528/322; 528/324; 528/373; 528/377; 528/380; 428/474.4

[58] Field of Search ............... 528/310, 312, 313, 321, 528/322, 324, 373, 377, 380; 428/474.4

[56] References Cited

U.S. PATENT DOCUMENTS

| | | | |
|---|---|---|---|
| 3,036,990 | 5/1962 | Kantor et al. | 260/47 |
| 3,036,991 | 5/1962 | Kantor et al. | 260/47 |
| 3,637,595 | 1/1972 | Cottis et al. | 260/47 C |
| 3,761,447 | 9/1973 | Blaise et al. | 528/174 |
| 4,011,199 | 3/1977 | McFarlane et al. | 260/47 |
| 4,224,433 | 9/1980 | Calundann et al. | 528/128 |
| 4,414,365 | 11/1983 | Sugimoto et al. | 525/437 |
| 4,430,493 | 2/1984 | Rieder | 528/179 |
| 4,436,894 | 3/1984 | Urasaki et al. | 528/176 |
| 4,440,920 | 4/1984 | Fujikake et al. | 528/128 |
| 4,474,938 | 10/1984 | Richardson | 528/176 |
| 4,603,190 | 7/1986 | Dicke et al. | 528/193 |
| 4,632,798 | 12/1986 | Eickman et al. | 264/272.17 |
| 4,816,555 | 3/1989 | Hisgen et al. | 528/176 |
| 4,843,140 | 6/1989 | Poll et al. | 528/176 |
| 4,876,327 | 10/1989 | Vriesema et al. | 528/173 |
| 4,904,756 | 2/1990 | Quentin | 528/193 |
| 4,912,193 | 3/1990 | Dicke et al. | 528/193 |
| 4,923,957 | 5/1990 | Tacke et al. | 528/194 |

FOREIGN PATENT DOCUMENTS

| | | |
|---|---|---|
| 0178185 | 4/1986 | European Pat. Off. . |
| 0368006 | 5/1990 | European Pat. Off. . |
| 1361847 | 7/1974 | United Kingdom . |

*Primary Examiner*—John Kight, III
*Assistant Examiner*—P. Hampton-Hightower
*Attorney, Agent, or Firm*—Bell, Seltzer, Park & Gibson

[57] ABSTRACT

Poly(arylene ether)ketones, polyamides, and poly(benzoxazoles) that contain thiophene rings within the aromatic polymer backbone are disclosed, along with fibers, films, and other articles of manufacture formed therefrom.

15 Claims, 7 Drawing Sheets

THIOPHENE-BASED POLYMERS

FIELD OF THE INVENTION

The invention relates generally to aromatic high-performance polymers, and relates more specifically to aromatic high-performance polymers containing thiophene rings.

BACKGROUND OF THE INVENTION

Many varieties of aromatic high-performance polymers are known. See, e.g., Vriesema, U.S. Pat. No. 4,876,327, concerning polyesters and the references cited therein. Generally high performance polymers comprise repeating aromatic monomer units which form a polymer backbone linked by some chemical bond, such as an ether, an ester, or an amide linkage. The presence of the aromatic groups provide chemical stability, structural integrity, and a high degree of linearity, and thus crystallinity, to the polymer.

One known group of aromatic high-performance polymer is the polyamides, which comprise generally phenyl groups linked at their 1 and 4 positions by amide linkages. This combination of 1,4 linked phenyl groups produces a highly linear polymer chain, which in macroscopic form forms a material which exhibits unusually high tensile strength and stiffness. One form is sold under the tradename Kevlar TM and is used extensively in fiber form in fabrics and composites. Another group of aromatic high-performance polymers is the poly(arylene ether ketones), which comprise phenyl groups alternatively linked at their 1,4 positions by ether linkages and ketone linkages. These materials, known in the art as "PEEK", are used in injection molding applications and as the matrix component in composite materials. An additional known aromatic high-performance polymer group is the poly(benzoxazoles). These polymers comprise alternating units of di-oxazole-benzene covalently bonded to the 1 and 4 positions of a phenyl group. The rodlike structure of the polymer chain conveys exceptional structural properties and high crystallinity on the polymer; however, concomitant intractability limits the processing options and, accordingly, the range of applications for poly(benzoxazoles).

It is an object of the present invention to provide polymer analogs to the aforementioned aromatic polymers which have different physical, chemical, and processing characteristics to increase the range of applications for these types of materials.

SUMMARY OF THE INVENTION

The foregoing objects and others are satisfied by the present invention, which includes as a first aspect a poly(arylene ether ketone) having liquid crystalline character, the poly(arylene ether ketone) comprising repeating units of the formula:

—[AB]— (I)

In this polymer, A comprises an aromatic diphenol having at least one aromatic ring. B comprises an aromatic ketone unit containing at least two aromatic rings joined by a ketone linkage; at least one of the aromatic rings comprises a thiophene ring. Each of the aromatic ketone units is linked at each end thereof to an aromatic diphenol unit by an ether linkage.

The invention includes as a second aspect an aromatic polymer comprising repeating units of the formula

—[AB]— (II)

In this polymer, A is a benzoxazole. B comprises an aromatic unit containing at least one thiophene ring. Each monomer unit of A is covalently bonded directly to a thiophene ring of B.

The invention includes as a third aspect an aromatic polyamide comprising repeating linked units of the formula:

—[AB]— (III)

In this polymer, A comprises an aromatic diamine unit terminating at each end with amine groups. B comprises an aromatic dicarbonyl unit containing at least one thiophene ring and terminating at each end with carbonyl groups. The terminal amine of each monomer unit of A is linked to a terminal carbonyl carbon of B to form an amide linkage.

Thiophene, shown in Formula (IV),

(IV)

is a highly aromatic organic moiety, and thus is an attractive choice for inclusion into high temperature polymers, which require thermally and chemically stable moieties to withstand the polymerization, processing, and end use conditions to which the polymer is exposed. The substitution of a thiophene moiety for a 1,4 linked phenyl group into the polymer backbone introduces an angle or "kink" of 148. into the otherwise linear polymer chain; this angle differs from that produced by the inclusion of a 1,3 linked phenyl group in the chain, which introduces a 120 kink into the chain. The presence of the 148 kink influences several physical properties of the polymer, including the capability of the polymer to crystallize and the rate at which it does so, the ability of the polymer to exhibit so-called "liquid crystalline" behavior, in which the polymer forms a crystalline-like arrangement of molecules in the liquid phase—a mesophase—thereby increasing the degree of polymer chain orientation in the solid phase, and the toughness and tensile strength of the polymer.

Inclusion of thiophene into an aromatic polymer chain backbone also provides a functionality, namely a sulfur atom, which influences the polymer's chemical properties and can favorably influence the ability of the polymer chain to interact with other substances within a mixture. For example, the presence of the sulfur-containing heterocycle can affect the dielectric properties of a polymer, its optical properties, and its permeability to different gasses, each of which are properties that end-users of a polymer may find attractive. In addition, the inclusion of thiophene can improve the compatibility of a polymer with other polymer types in a blend or alloy, the adhesion of the polymer to organic or inorganic substrates, such as in a coating or in a composite matrix, and the polymer's solubility in various solvents.

DETAILED DESCRIPTION OF THE INVENTION

Figure 1:
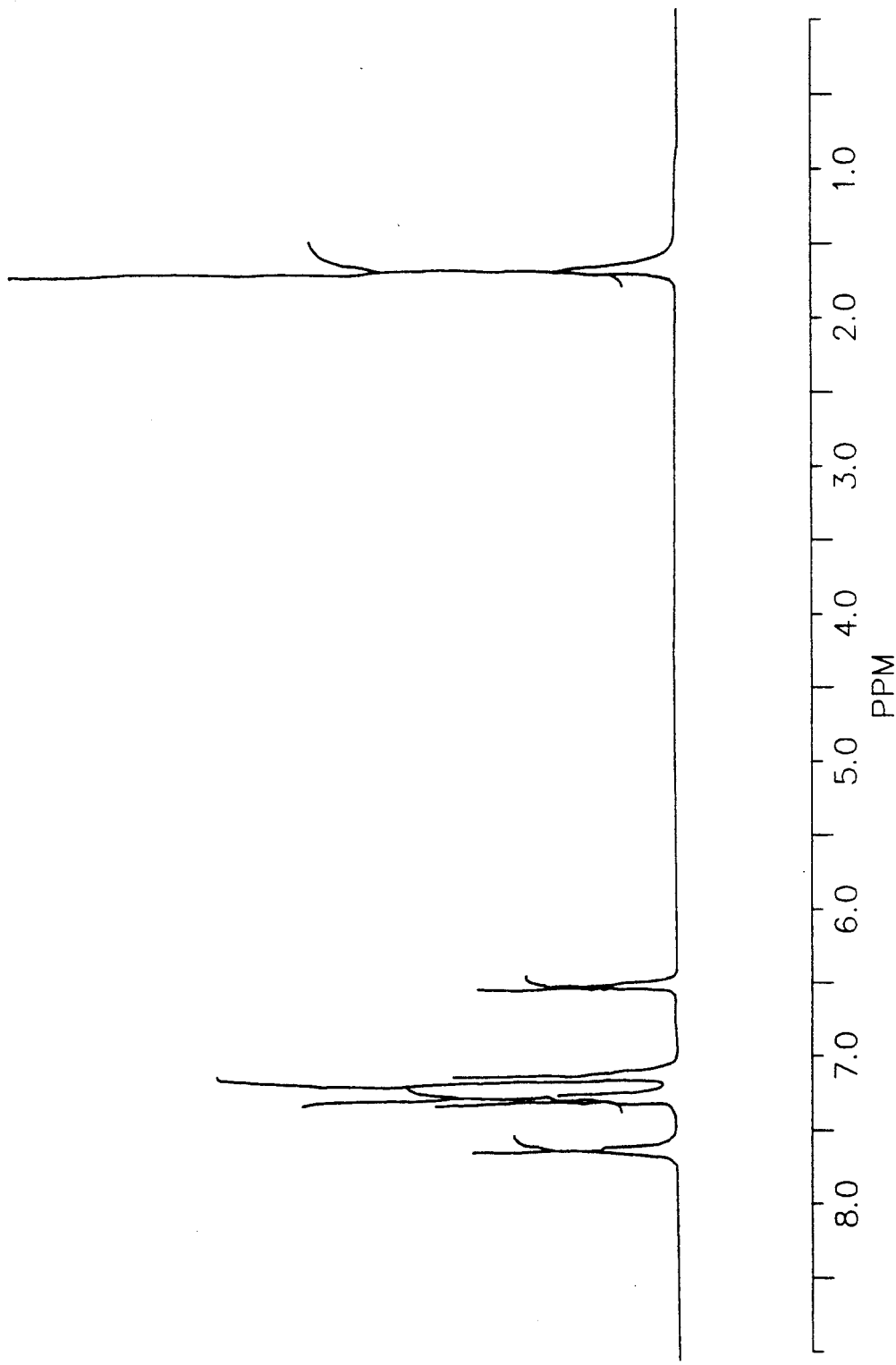
FIG. 1 is an NMR spectrum of a poly(arylene ether)ketone formed from bis(5-chlorothienyl-2-)ketone and bisphenol A.

The invention regards the introduction of the thiophene moiety into the backbone of high-performance aromatic polymers. The substitution of the thiophene moiety for a phenyl group present in a monomer can enhance the properties of these polymers in a number of ways.

The present invention includes a poly(arylene ether ketone) comprising repeating units of the formula:

—[AB]— (I)

According to the invention, A comprises an aromatic diphenol having at least one aromatic ring B comprises an aromatic ketone unit containing at least two aromatic rings joined by a ketone linkage; at least one of the aromatic rings comprises a thiophene ring. Each of the aromatic ketone units is linked at each end thereof to a phenolic oxygen of an aromatic diphenol by an ether linkage.

In the polymer of formula I, monomer A can be any aromatic diphenol which includes at least one aromatic ring. The aromatic ring may be entirely composed of carbon atoms, or may be heterocyclic. Multiple rings can be directly covalently linked, as in biphenol, or can include alkyl linkages, or linkages of a different functional group, such as ethers or ketones. The aromatic rings may be unsubstituted or substituted, as may any linkage which bonds multiple aromatic rings, but the substituents should include only those which will not interfere with the polymerization process, such as alkyl groups, alkoxy groups, and phenyl and other aromatic groups. Exemplary diphenols suitable for use in the polymer include di-hydroxybenzenes, di-hydroxy biphenyls, bisphenol A (4,4'-isoproylidenediphenol), diols of naphthalene, anthracene, phenanthrene, naphthacene, and pentacene, diols of pyridines, and other aromatic diphenols, such as those listed in Vriesema, U.S. Pat. No. 4,876,327, the contents of which are incorporated herein by reference. Preferably, the —OH groups of the diphenol which link to monomer B to form the polymer backbone are located at positions 180° from one another across the aromatic ring structure of the diphenol (e.g., in the 1 and 4 positions of benzene, or the 4 and 4' positions of biphenol) to effect a linear portion of the polymer chain. Preferred aromatic diphenols are hydroquinone (1,4 benzene-diol), 4, 4' biphenol, and 4, 4'-isopropylidenediphenol, with the latter being more particularly preferred.

In the polymer of Formula I, monomer B can be any aromatic ketone containing at least two aromatic rings joined by a ketone linkage wherein one of the aromatic rings comprises thiophene. The non-thiophene rings of B can be entirely composed of hydrocarbon or can be heterocyclic. Any of the aromatic rings of B can be unsubstituted or substituted; the substituents should be chosen so as not to interfere with the polymerization of the polymer. Suitable substituents include alkyl groups, alkoxy groups, and substituted or unsubstituted phenyl groups. Exemplary suitable aromatic ketones include bis(thienyl-2)ketone, 1,3 bis(thiophenoyl) benzene, 1,4 bis(thiophenoyl)benzene, 2,5-bis(thiophenoyl)thiophene, 2,5 bis-(1-benzoyl)thiophene, and 2-phenyl 2-thioenyl ketone. Preferred thiophene-containing aromatic ketones are bis(thienyl-2)ketone, 1,3 bis(thiophenoyl)benzene, 1,4 bis(thiophenoyl)benzene, 2,5-bis(thiophenoyl)thiophene, and 2,5 bis-(1-benzoyl)thiophene. More preferably, when a thiophene moiety of monomer B is ether-linked to monomer A, as in bis(thienyl-2)ketone, 1,3 bis(thiophenoyl)benzene, or 1,4 bis(thiophenoyl) benzene, it is linked thereto at its 2 position; if a benzene moiety is ether-linked to monomer A, as in 2,5 bis-(1-benzoyl)thiophene, it is linked thereto at its 4 position.

The poly(arylene ether)ketone can also comprise a copolymer further comprising aromatic ketone units which do not include a thiophene ring. The substitution of these units can alter the physical properties of the polymer by increasing the linearity of the polymer backbone and by modifying the functional groups available for interaction with other materials in a mixture Such ketone units are linked at each end by an ether linkage to a phenolic oxygen of an aromatic diphenol of A. Exemplary aromatic ketone units include diphenyl ketone, di-biphenyl ketone, phenyl-biphenyl ketone, 1,4-bis(1-benzoyl)benzene, and 1,3-bis(1-benzoyl) benzene.

The polymerization of this poly(arylene ether)ketone can be carried out by known polymerization methods for poly(arylene ether)ketones. Exemplary is a nucleophilic substitution reaction, wherein a dihalide derivative form of monomer B is reacted with the diphenate of monomer A in stoichiometric ratio in a polar, aprotic solvent such as N-methyl pyrrolidinone under heat. The phenolic hydrogens of monomer A and the halogens of monomer B are displaced, thereby permitting the formation of an ether linkage between the monomers. The reaction can be carried out in the presence of a weak base, such as potassium carbonate, and an azeotroping agent, such as toluene.

The polymer can take a number of useful forms. It can be spun or otherwise manufactured into high-strength fibers. It can also be extruded, solvent cast, or otherwise formed into high-strength films and sheets. It can be ground into a filled or unfilled resin to be subsequently formed into molded articles of a desired configuration. Because of the functionality provided by the sulfur atom of the thiophene group, the polymer has enhanced adhesive properties, and thus can be used as a coating on a foreign substrate, or as the matrix component of a composite material containing inorganic or organic fillers such as carbon fibers, glass fibers, glass beads, mineral fibers, talc, and the like.

The present invention also includes an aromatic polyamide comprising repeating linked units of the formula:

$$-[AB]- \quad (II)$$

In this polyamide, monomer A comprises an aromatic diamine unit containing at least one aromatic ring and terminating at each end with amine groups. Monomer B comprises an aromatic dicarbonyl unit containing at least one thiophene ring and terminating at each end with carbonyl groups. Each of the units of monomer A is linked by its terminal amine groups to a carbonyl group of monomer B, thereby forming an amide linkage.

The monomer A of Formula II comprises an aromatic diamine which terminates at either end with amine groups. The aromatic substituent of A may be entirely composed of carbon atoms, or may be heterocyclic. It may be unsubstituted or substituted with any substituent that will not interfere with the polymerization process, such as alkyl groups, alkoxy groups, and unsubstituted or substituted phenyl groups, although the presence of certain substituents can affect the crystallinity and crystallization rate of the polymer. The aromatic structure of diamine A may include a single aromatic ring or may include multiple rings. Exemplary ring structures suitable for use in monomer A include benzene, naphthalene, anthracene, phenanthrene, pentacene, naphthacene, pyrimidines, and biphenyl, and the substituted and unsubstituted amine analogs of the phenoxy groups listed in Vriesema, U.S. Pat. No. 4,876,327, the subject matter of which is herein incorporated by reference. The amine groups can be primary or secondary; secondary amines should have substitutents that, as described above, do not interfere with the polymerization process. Preferred aromatic di-amines are those which include terminal amine groups in positions which are located at positions 180° from one another across the aromatic structure, such as 4, 4' diaminobiphenyl and 1,4 di-aminobenzene, with 1,4 di-aminobenzene being more preferred.

The polymer of Formula II includes a thiophene-containing aromatic monomer B which includes carbonyl groups at each of its ends thereof. The monomer can be unsubstituted or substituted with substituents that do not interfere with the polymerization process, such as alkyl groups, alkoxy groups, and unsubstituted and substituted phenyl groups. Exemplary aromatic compounds suitable as monomer B include 2,5 di-carbonyl thiophene, 2-carbonyl-5-benzoyl thiophene, bis(2-thiophenoyl) ketone, and 2,5-bis(N-4-benzoyl)thiophenediamide, with 2,5-di-carbonyl thiophene and 2,5-bis(N-4-benzoyl) thiophenediamide being more preferred. When the carbonyl carbon that links monomer B through an amide linkage to monomer A is also linked to a thiophene ring, it is preferred that the carbonyl group be attached to the 2 or 5 position of the thiophene ring. If the carbonyl carbon that links the monomer to monomer A links to a phenyl ring, it is preferred that the carbonyl carbon be linked to the 4 position of the phenyl ring.

The polyamides of the present invention can exhibit liquid crystalline properties. Liquid crystalline polymers are defined as those polymers which exhibit a unique liquid crystalline phase—a lyotropic mesophase wherein the polymer chains assume a virtually parallel (or "nematic") supramolecular structure in the melt phase or in concentrated polymer solutions. As a consequence of this ordered suprastructure in the liquid phase, the solid formed from the cooling liquid comprises polymer chains that are oriented substantially parallel with one another; this ordered crystalline structure provides exceptional strength and rigidity in the direction parallel to the molecular alignment, particularly at elevated temperatures, when compared to non-liquid crystalline materials. The structural properties of liquid crystal polymers make them attractive for numerous industrial applications. Like many linear aromatic polymers, 1,4-phenyl-linked polyamides generally exhibit liquid crystalline behavior; however, 1,3-phenyl-linked polyamides generally do not because of the deviation from linearity due to the 120° kink in the polymer chain caused by the 1,3-phenyl linkage. The 148° kink effected in the a polyamide chain by a thiophene ring does not preclude liquid crystalline behavior in the polyamides of the present invention; accordingly, the attendant improvement in structural properties and lower melting temperature can also be present in these polymers.

The polyamide can also comprise a copolymer further comprising aromatic dicarbonyl units which do not contain thiophene, wherein these units terminate at each end with a carbonyl group each of which is linked to an amine group of monomer A through an amide linkage. The inclusion of these non-thiophene containing units increases the linearity of the polymer chain, which in turn can affect the crystallinity, structural properties, and chemical properties of the polymer chain. Exemplary aromatic units include 1,4-dicarbonylbenzene, 4,4'-dicarbonylbiphenyl, and 2,2-bis(4-benzoyl)isopropane.

The polyamide of the present invention can be made by conventional polyamide polymerization techniques, such as the formation of the amide linkage by the reaction of the di-amine monomer with the di-acyl or di-acid halide corresponding to monomer B. Such a reaction would generally be carried out in a polar, aprotic solvent, such as a mixture of N-methyl pyrrolididone and phosphoric acid, at low temperature.

The polyamide of the present invention can exist in many forms. It can be spun or otherwise manufactured into fibers. The polyamide can be extruded, solvent cast, or otherwise made into sheet or film. It can be ground into a resin, which can in turn be formed through molding or other forming technique into a desired shape. Because of the presence of the thiophene moiety in the polyamide, the polymer has a functionality able to adhere to a foreign substrate; thus the polymer can be used as a coating on a foreign article, or as the matrix component of a composite material.

The present invention also includes a polymer comprising repeating units of the formula $$-[AB]- \quad (III)$$

In this polymer, monomer A is a benzoxazole. Monomer B comprises an aromatic unit containing at least one thiophene ring. Monomer A is covalently bonded directly to a thiophene ring of Monomer B.

The structure represented by A in Formula III can be any unsubstituted or substituted benzoxazole. Substitutents can be any that do not interfere with the polymerization process, such as alkyl, alkoxy, and unsubstituted or substituted phenyl groups. Preferably, A comprises benza-di-oxazole; more preferably, A comprises benza-di-oxazole which is covalently linked at each end thereof by the free carbon atom of the oxazole group to monomer B.

The structure represented by B in Formula III can be any thiophene-containing aromatic compound that can form a covalent bond directly to benzoxazole. B can be a single thiophene molecule, a series of linked thiophene rings, or at least one thiophene molecule linked through a ketone or other linkage to a non-thiophene containing aromatic structure, which consists only of carbon atoms or which can be heterocyclic. The aromatic rings of monomer B can be unsubstituted or can be substituted with substituents which do not interfere with the polymerization process, such as alkyl, alkoxy and unsubstituted or substituted phenyl groups. The preferred structure for monomer B is thiophene; more preferably, monomer B comprises thiophene covalently bound at its 2 and 5 positions to units of A.

The polybenzoxazoles of the present invention can exhibit liquid crystalline characteristics. The known 1,4 phenyl-linked poly(benyoxazole) is a liquid crystal polymer; data shows that the introduction of a thiophene ring into the polymer backbone does not preclude formation of a nematic molecular structure in the melt phase.

The polymer can also comprise a copolymer further comprising aromatic units which do not contain thiophene. These aromatic units are covalently linked directly to the benzoxazole monomer. Exemplary of an aromatic unit of this type is benzene, which is preferably linked to monomer A it the 1 and 4 positions phenyl-biphenyl ketone, di-biphenyl ketone, 1,4-bis(1-benzoyl)-benzene, and 1,3-bis(1-benzoyl)benzene.

The polymer of Formula III can be made by any conventional polymerization techniques for poly(benzoxazoles), such as the reaction of 4,6 diamino, 1,3-benzenediol dihydrochloride with 2,5 thiophene dicarbonyl chloride. The reaction is generally carried out in a polar solvent, such as a mixture of poly(phosphoric acid) and toluene at elevated temperature.

The polyamide of the present invention can exist in many forms. It can be spun or otherwise manufactured into fibers. The polyamide can be extruded, solvent cast, or otherwise made into sheet or film. It can be ground into a resin, which can in turn be formed through molding or other forming technique into a desired shape. Because of the presence of the thiophene moiety in the polyamide, the polymer has the capacity to adhere to a foreign substrate, and thus can be used as a coating on a foreign article, or as the matrix component of a composite material.

The present invention is described in greater detail in the following examples, which are not intended to be limiting, but instead are provided for more complete understanding of the invention. As used herein, "mol" means moles, "mL" means milliliters, "dL/g" means deciliters per gram, "mHz" means mega Hertz, "g" means grams, ".C" means degrees Centigrade, "M" means molar concentration, "ppm" means parts per million, "NMP" means N-methyl pyrrolididone, "NMR" means nuclear magnetic resonance, "mp" means melting point, and "nm" means nanometers.

EXAMPLE 1

Synthesis of 2-Benzoyl-5-(4-t-butyl-phenoxy)thiophene Monomer 2-benzoyl-5-chlorothiophene was synthesized via Friedel-Crafts acylation of benzoyl chloride with 2-chlorothiophene. This was reacted under standard conditions with 4-t-butyl phenol to produce 2-benzoyl-5-(4-t-butyl-phenoxy)thiophene. It was discovered by thin layer chromatography that the displacement of the acyl chloride proceeds completely with no side reactions. Complete nucleophilic displacement demonstrates that this reaction meets the requirements necessary for high polymer formation via a step growth reaction.

EXAMPLE 2

Synthesis of Bis-(5-chlorothienyl-2)ketone Monomer

Oxalyl chloride (0.08475 mol) was added gradually over five minutes to a stirred suspension of anhydrous aluminum chloride (0.1695 mol) in 75 mL of dry dichloroethane. A solution of 2-chlorothiophene (0.25425 mol) in 75 mL of dichloroethane was added dropwise and stirred for 24 hours at room temperature, then poured onto crushed ice. The organic layer was separated immediately, dried by filtering through anhydrous sodium sulfate, and stripped of solvent in vacuo. The dry solid was washed twice with 200 mL of 5% KOH solution, twice with 200 mL of 5% HCl, and once with 500 mL of water. The product was recrystallized from ethanol to produce a 40% yield of light yellow crystals.

EXAMPLE 3

Synthesis of 1,3-Bis(2-chlorothiophenoyl)Benzene Monomer

A solution of 2-chlorothiophene (0.128 mol) in 20 mL of carbon disulfide was added to a stirred suspension of isophthaloyl chloride (0.064 mol) and anhydrous aluminum chloride (0.1408 mol) in 100 mL of carbon disulfide. The reaction mixture was heated to reflux, stirred under nitrogen for 3 hours, and poured into 300 mL of water. The organic layer was separated immediately, then washed twice with 300 mL of 10% NaOH, twice with 300 mL of 5% HCl, and once with 500 mL of water. The product was recrystallized twice from ethyl acetate to form light yellow crystals in a 75% yield. Purity was determined by GC to be greater than 99.9%.

EXAMPLE 4

Synthesis of 1,4-Bis(2-chlorothiophenoyl)Benzene Monomer

The synthesis of this monomer was identical to that described in Example 2 for 1,3-Bis(2-chlorothiophenoyl)benzene with terephthaloyl chloride being substituted for isophthaloyl chloride. The synthesis produced light yellow crystals in a 75% yield.

EXAMPLE 5

Synthesis of Polymers of Thiophene-containing Ketone Monomers and 4,4'-Isopropylidenediphenol A typical polymer synthesis was conducted in a three-necked, 100-mL, round-bottom flask equipped with a mechanical stirrer, gas inlet, thermometer, Dean Stark trap, and condenser. The flask was charged with bis-(5-chlorothienyl-2)ketone (0.01140 mol) and 4,4'-isopropylidenediphenol (0.01140 mol) in 25 mL of NMP via syringe. To this solution was washed potassium carbonate (0.0171 mol) in 5 mL of NMP (50 % molar excess). Approximately 8 mL of toluene was added to this solution. The mixture was then heated to reflux at an optimum temperature of 150° C. Water generated during the phenoxide formation was removed over a 6 hour period. The reaction temperature was then increased to 175° C. for another 12 hours. Completion of the polymerization was estimated by the increase in the viscosity. The polymer was coagulated in a ten-fold excess of methanol, dried, and reprecipitated from chloroform into methanol.

Polymerizations of 1,3 and 1,4-bis(2-chlorothiophenoyl) benzene monomers with 4,4'-isopropylidenediphenol were carried out as previously described to achieve high molecular weight polymers.

EXAMPLE 6

Characterization of Polymer Formed from Monomers Bis-(5-chloro-thienyl-2)ketone and 4,4'-Isopropylidenediphenol The thiophene-based poly(arylene ether) produced by the procedure described in Example 4 was of high molar mass, as evidenced by a viscosity of 0.66 dL/g (NMP, 25° C.). A solvent cast, vacuum dried film of the polymer was of very high quality. It had a transparent, amber color and was very creasable.

Figure 2:
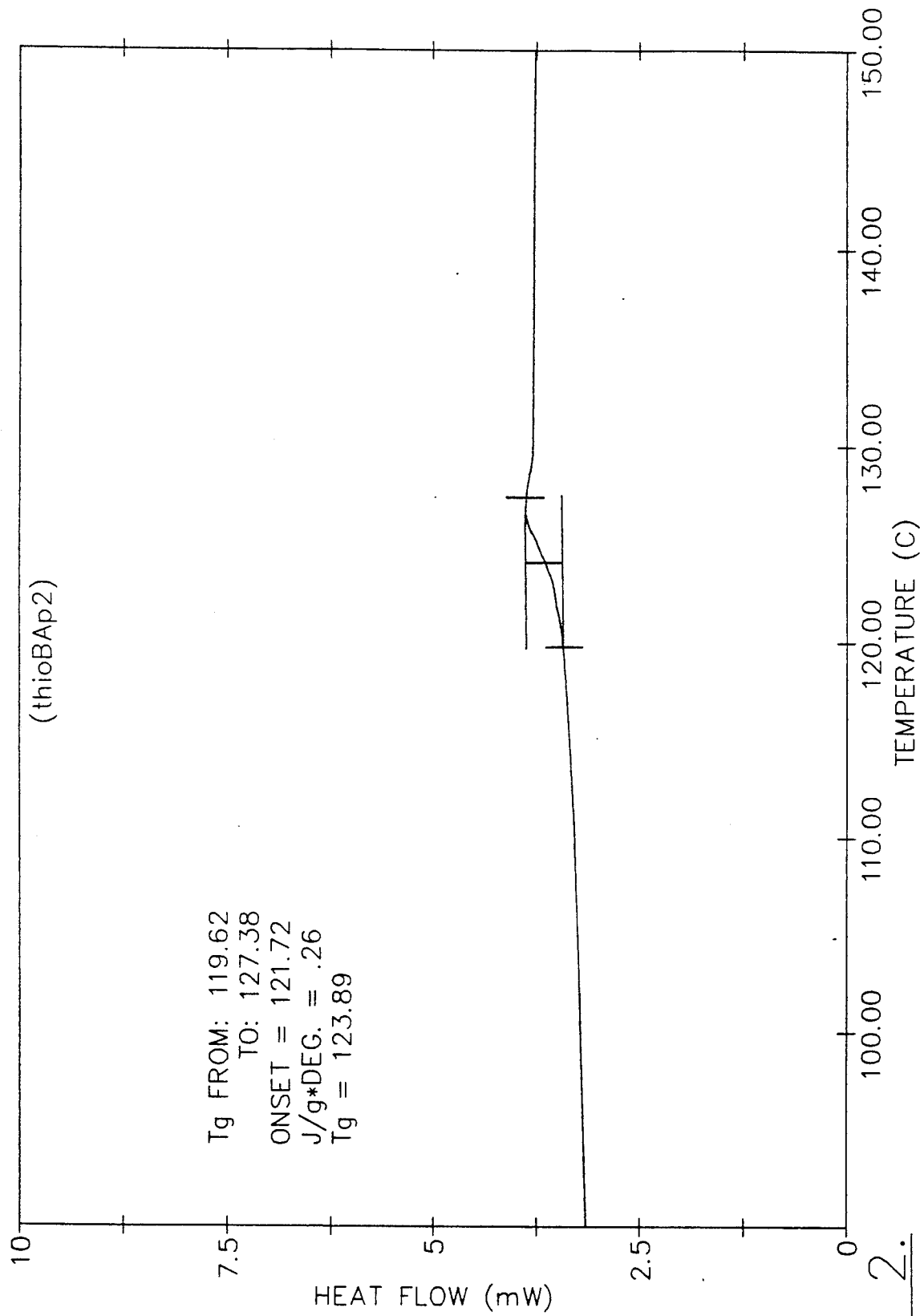
FIG. 2 is TGA spectrum for the poly(arylene ether)ketone formed from bis(5-chlorothienyl-2-)ketone and bisphenol A.
Figure 3:
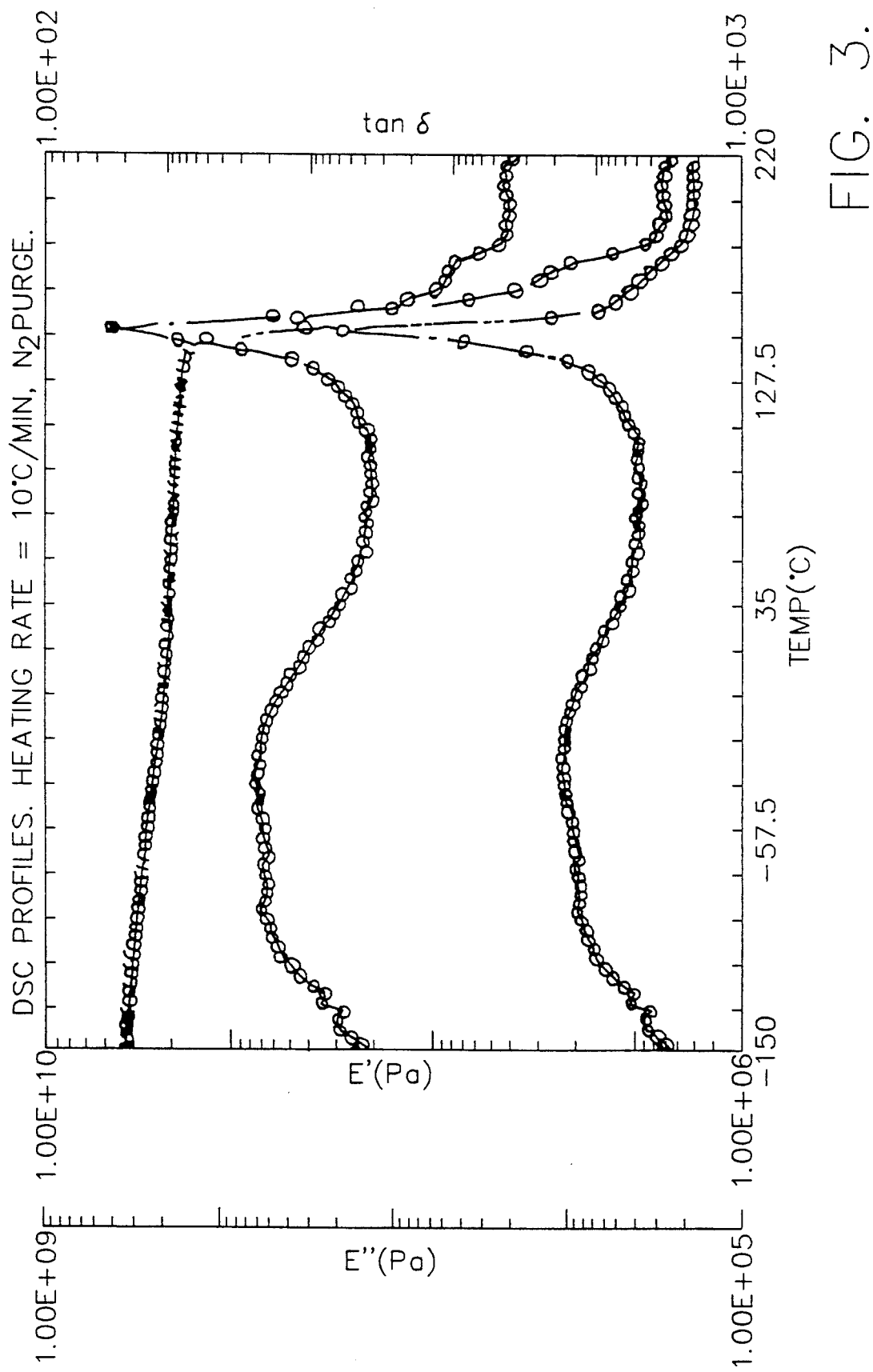
FIG. 3 is a TGA spectrum for the poly(arylene ether)ketone formed from BFTh and bisphenol A.

The Proton NMR spectra shown in FIG. 1 were taken in $CDCl_3$ on a Bruker AC-200 at 200.113 MHz. This analysis showed easily distinguishable thiophene, phenyl, methyl protons when compared with the starting materials. Key in the spectrum was the upfield shift of the thiophene proton next to the oxygen from 6.98 ppm to 6.42 ppm indicating formation of the thienyl ether linkage. A Hewlett-Packard GC-mass spectrometer (5890A-5971A) was used for product identification. The molecular weight of the polymer was determined using the Waters 150-CV gel permeation chromatograph with polystyrene standards to be approximately 39,000 g/mol. The glass transition temperature of the polymers was obtained using a Perkin-Elmer DSC-7 apparatus, and was found to be 124° C. (approximately 30° C. less than the 1,4-based polymer) (FIG. 2). The values reported were obtained from the second heat at the midpoint using a 10° C./min heating rate. Thermogravimetric analysis performed on a Perkin-Elmer TGS-4 indicated that the polymer suffers a 5% weight loss at 419° C. under nitrogen atmosphere and a bimodal 5% weight loss in air at 430° C.

EXAMPLE 7

Synthesis of 2,5-Bis(4-fluorobenzoyl)thiophene (BFTh)

In a three neck 100 ml flask fitted with a condenser, magnetic stirrer and nitrogen inlet, 3.46 g (0.026 mole) of anhydrous powdered aluminum chloride was added to a stirred solution of 2.09 g (0.01 mole) of 2, 5-thiophene diacid chloride in 30 ml (0.32 mole) of fluorobenzene. The mixture was refluxed for 6 hours at 80° C. The excess fluorobenzene was distilled and the product was washed with 5% NaOH, 5% HCl, and water. The monomer was filtered and recrystallized three times from acetone. (yield=2.07 g, mp 186° C.)

EXAMPLE 8

Synthesis of 1,4- and 1,3-Bis(4-fluorobenzoyl)benzene 1,4-Bis (4-fluorobenzoyl)benzene (p-BFT) and 1,3-Bis(4-fluorobenzoyl) benzene (m-BFT) were synthesized using the same procedure described in Example 9 for BFTh. The melting points for p-BFT and m-BFT are 233° C. and 187° C., respectively.

EXAMPLE 9

Synthesis of Poly(arylene ether)ketone from 2,5-Bis(4-fluorobenzoyl)thiophene (BFTh) and 4,4' Isopropylidenediphenol Synthesis was conducted in a three-neck 200 mL flask equipped with a mechanical stirrer, nitrogen inlet, Dean-Stark trap and condenser. The flask was charged with 1.97 g (0.006 mole) of BFTh, 1.37 g (0.006 moles) of 4,4'-isopropylidenediphenol (recrystallized from acetone), 1.74 g (0.0126 mole) of dry potassium carbonate, 16 ml of distilled N-methyl-2-pyrrolidinone (NMP) and 12 ml of distilled toluene. The reaction mixture was stirred at 140° C. for 3.5 hours. Upon dehydration, the toluene was removed and the reaction mixture was stirred for another 3 hours at 140° C. The reaction was qualitatively determined to be near completion by a significant viscosity increase in the solution. The polymer was precipitated into water, washed with acetone, and dried in vacuo at 120° C. for 24 hours. A total of 3.05 g (98%) of the polymer was recovered. The p-phenylene and m-phenylene poly(arylene ether) analogues based on p-BHT and m-BHT were synthesized in a similar manner; however, the polymerizations with p-BHT and m-BHT required higher polymerization temperatures (170° C.) for an additional 8 hours.

EXAMPLE 10

Figure 4:
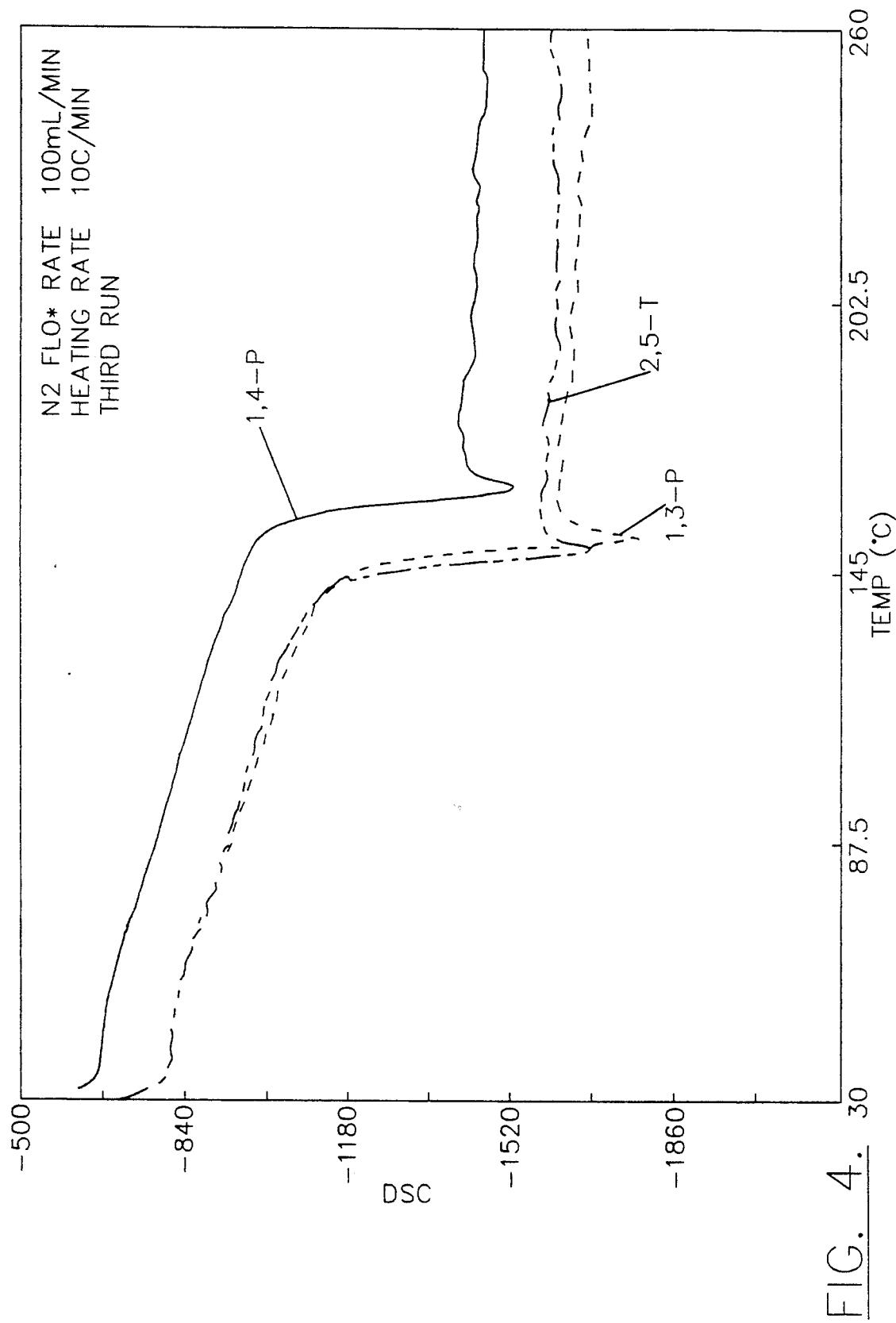
FIG. 4 is a DSC profile for the poly(arylene ether)ketone formed from BFTh and bisphenol A.

Characterization of the Poly(arylene ether)ketone Formed from 2,5-Bis(4-fluorobenzoyl)thiophene (BFTh) and 4.4' Isopropylidenediphenol Intrinsic viscosity measurements were performed in NMP at 25° C. using a Cannon-Ubbelohde viscometer. The viscosity values for each of the polymers synthesized are shown in Table 1. $^{13}C$ and $^{1}H$ NMR studies were done in $CDCl_3$ on a Bruker AC-200 to assess the adipic acid to thiophene diacid chloride transformation, as well as to follow the polymerization of the difluoromonomers. Glass transition temperatures of the polymers, shown in Table 1 and FIG. 4, were determined using a Perkin-Elmer DSC-7. The values reported were obtained from the second heat using a 20° C./min heating rate. The glass transition temperatures (Tg) of the poly(arylene ether) series shows, as expected, a strong dependance on the core angle of the diketone unit in the polymer chain (Table 1).

TABLE 1

| Monomer | viscosity 25° C., NMP | $T_g$ (°C.) | T(°C. at 10% weight loss) |
|---|---|---|---|
| m-BFB | 0.79 | 152 | 502 |
| BFTH | 1.23 | 158 | 475 |
| p-BFB | 0.92 | 166 | 523 |

EXAMPLE 11

Synthesis of Poly(2,5-thienyl Benzobisoxazole) (PBOT)

PBOT was prepared in poly(phosphoric acid) (PPA) using the $P_2O_5$ adjustment method (see Wolfe, *Encyclopedia of Polymer Science and Engineering* ch. 11, 601 (1988)) to control the PPA composition at various stages of the synthesis. The polymerization was carried out to give a final polymer concentration of 20 wt % in order to insure that the critical concentration for nematic mesophase formation was exceeded.

Before each synthesis, the PPA was freshly prepared by mixing 2.14 g phosphorous pentoxide with 3.18 g of phosphoric acid (85%) and stirring under argon at 115° C overnight. Once the PPA became clear and homogeneous, 2.13 g (0.01 mol) of 4,6-diamino-1,3-benzenediol dihydrochloride was added while still stirring under argon at 115° C. Due to the low solubility of this monomer, these conditions were maintained for four days to allow complete dissolution and dehydrochlorination of the monomer. Over this time period a total of 3.92 g of $P_2O_5$ was added to the solution in small increments, as suggested in the $P_2O_5$ adjustment method; this aids in solubilizing the monomer and is necessary for the polycondensation stage. At the end of this four day period, 2.09 g (0.01 mol) 2,5-thiophene dicarbonyl chloride and approximately 10 mL of toluene were added to the reaction mixture; the toluene refluxed above the reaction mixture, returning any sublimed material to the reaction. The temperature of the solution was raised to 185° C. within 1 hour of the addition of the thiophene monomer; within a few hours, the polymer mixture became extremely viscous. At this point, the PPA solution exhibited spontaneous birefringence (data not shown), the signature of a lyotropic liquid crystal. The schlieren texture seen in cross-polar analysis is indicative of a lytropic nematic phase. Hence the important precursor phase to ultra-high strength fibers is accessible in concentrated solutions of the nonlinear PBOT macromolecule.

EXAMPLE 12

Characterization of Poly(2,5-thienyl Benzobisoxazole)

PBOT was prepared for analysis by dissolving the viscous, solid-like reaction mixture containing the polymer in methane sulfonic acid (MSA), precipitating the polymer in methanol, washing with methanol and water, and then continuously extracting with methanol in a Soxlet extractor for 12 hours. An intrinsic viscosity of 1.8 dL/g was obtained for this polymer in MSA. An NMR spectrum supported the molecular structure of PBOT. Thermogravametric Analysis (TGA) was carried out in helium with a Perkin-Elmer TGA-7 and in air with a Seiko TGA.

Figure 5:
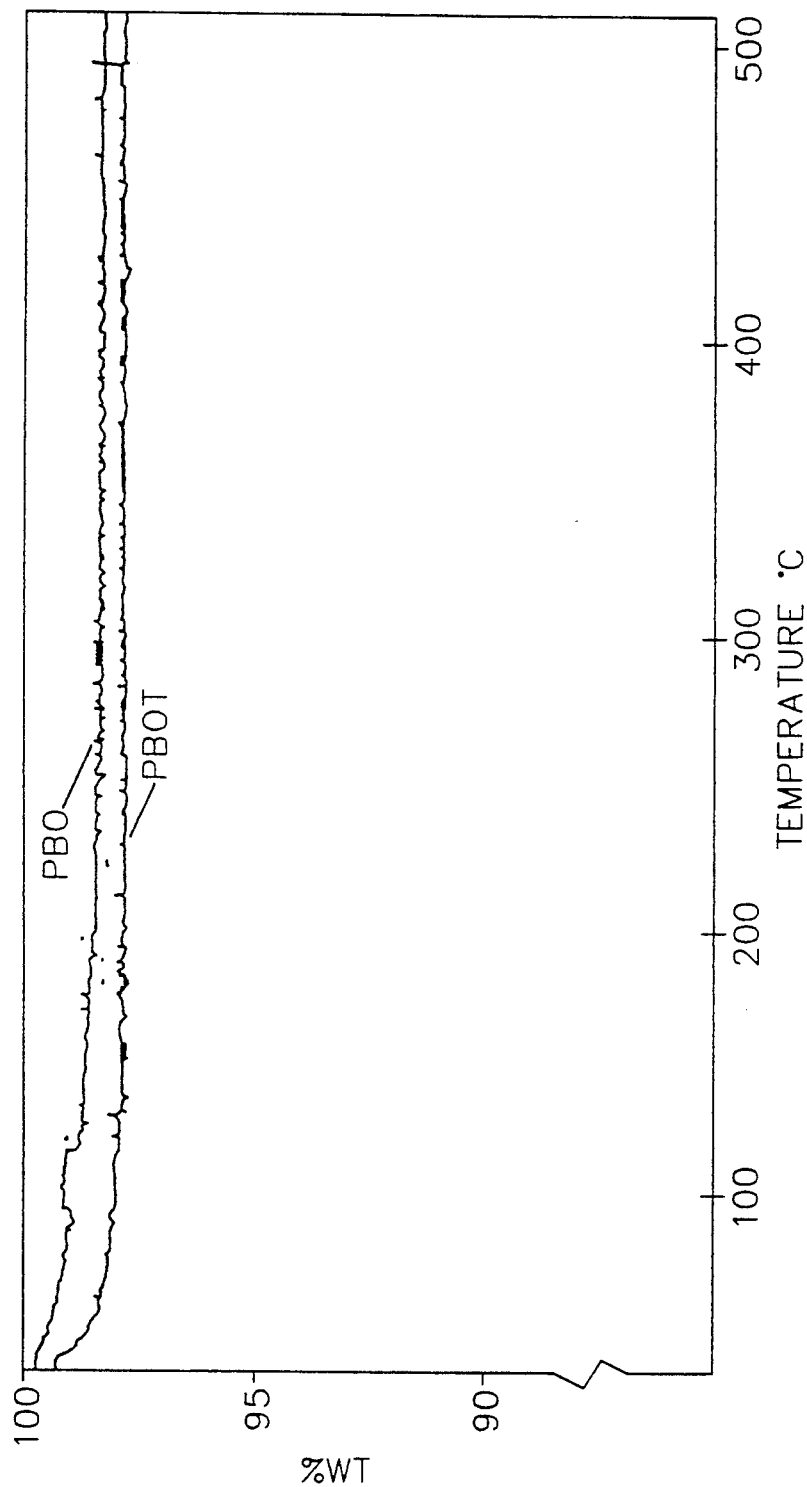
FIG. 5 is TGA spectrum for a poly(benzoxazole) formed from 4,6-diamino-1,3-benzenediol syhydrochloride and 2,5-thiophene dicarbonyl chloride.

FIG. 5 compares TGA scans of PBO and its thiophene analogue PBOT in helium and in air; there is no indication of weight loss up to 500° C. for either polymer. PBOT shows thermal stability comparable to that of PBO, i.e., the primary structure of the polymer is not weakened upon the introduction of the sulfur-containing heterocyclic unit into the backbone.

EXAMPLE 13

Persistence Length of PBOT, PBO and ABPBO

Recently it has been suggested that chain persistence is a critical variable for mesophase formation in semiflexible polymers. This Example qualitatively contrasts the persistence length, Rx, for the new PBOT polymer with that of the essentially rectilinear PBO chain and that of the nonlinear poly(2,5-benzoxazole) (ABPBO) chain, another polymer in this class having a 150° bend in its primary structure.

The persistence length values for all three structures were obtained via a numerical simulation technique in which the dihedral angles were randomly varied to "grow" chain configurations. The projection $R_x$ of the end-to-end vector on the direction of the initial segment (along the x-axis) was averaged for several hundred of such randomly generated chain configurations to obtain the average persistence length of a polymer at a given degree of polymerization N, $<R_x(N)>$. It is important to note that these calculations represent lower limits for $<R_x(N)>$. PBOT and ABPBO have markedly smaller persistence lengths ($<R_x>N \approx 7.5$ nm and $<R_x>N \approx 4.5$ nm respectively) than PBO.

In order to introduce some structural realism into the calculation of $<R_x(N)>$ for the latter chain, an MM2 minimization was performed on the benzoxazole unit; a 2.4° deviation from linearity with respect to this unit's exocyclic bonds was found. However, when incorporated into the calculation of $<R_x>$ for PBO, this small structural nonlinearity is negligible; $<R_x(N)>$ is found to be essentially proportional to N. These findings are in qualitative agreement with recent calculations of Windle wherein more realistic torsion angle potentials were used. As all three polymers have experimentally been shown to yield liquid crystalline phases, these results suggest that only a rather small critical persistence length is necessary for the formation of the liquid crystalline phase.

EXAMPLE 14

Synthesis and Purification of Monomers 2,5 Thiophene Diacid Chloride and 2.5 Thiophene Diacid 2,5-thiophene diacid chloride was prepared by the procedure described in Kwon et al., *J. Polymer Sci.* 25:1781 (1987). 2,5-thiophene diacid was purified by the hydrolysis and acidification of the corresponding diethyl ester followed by sublimation.

EXAMPLE 15

Synthesis of 2,5-thiophene-based Low Molecular Mass Diamide

Phosphorylation reaction conditions were used in this procedure. See Higashi et al., *J. Polym. Sci., Polym. Chem. Ed.* 20:2081 (1982). A 250 mL three neck flask fitted with a condenser, magnetic stirrer, and an inlet and outlet for nitrogen gas was placed in an oil bath kept at 115° C. To remove air and traces of moisture, the flask was flushed with a stream of nitrogen gas. To the prepared reaction vessel were added 0.005 mol (0.86 g) of 2,5-thiophene diacid, 0.01 mol (1.933 g) of 4-hexyloxyaniline, and the solvent medium consisting of 50 mL N-methyl-2-pyrrolididone, 10 mL pyridine, 3 g $CaCl_2$ and 1 g LiCl. The reaction mixture was stirred for 10 min and then 0.01 mole (3.1 g) of triphenyl phosphite was added. After 1.5 hours the reaction mixture was poured in 50/50 vol % water-methanol mixture, then filtered. The product was washed with 5% sodium hydroxide, 5% hydrochloric acid, and water, recrystallized 3 times from dimethylsulfoxide, washed with water again, and dried at 120° C. overnight (yield 2.24 g).

EXAMPLE 16

Synthesis of 1.3- and 1,4-Phenylene-based Low Molecular Mass Diamides 1,3- and 1,4-phenylene-based low molecular mass diamides were synthesized using the same procedure as for 2,5-thiophene-based diamide described in Example 17, with the substitution of terephthalic acid and isophthalic acid for 2,5 thiophene diacid.

EXAMPLE 17

Liquid Crystalline Character of Low Molecular Mass Diamides

Figure 6:
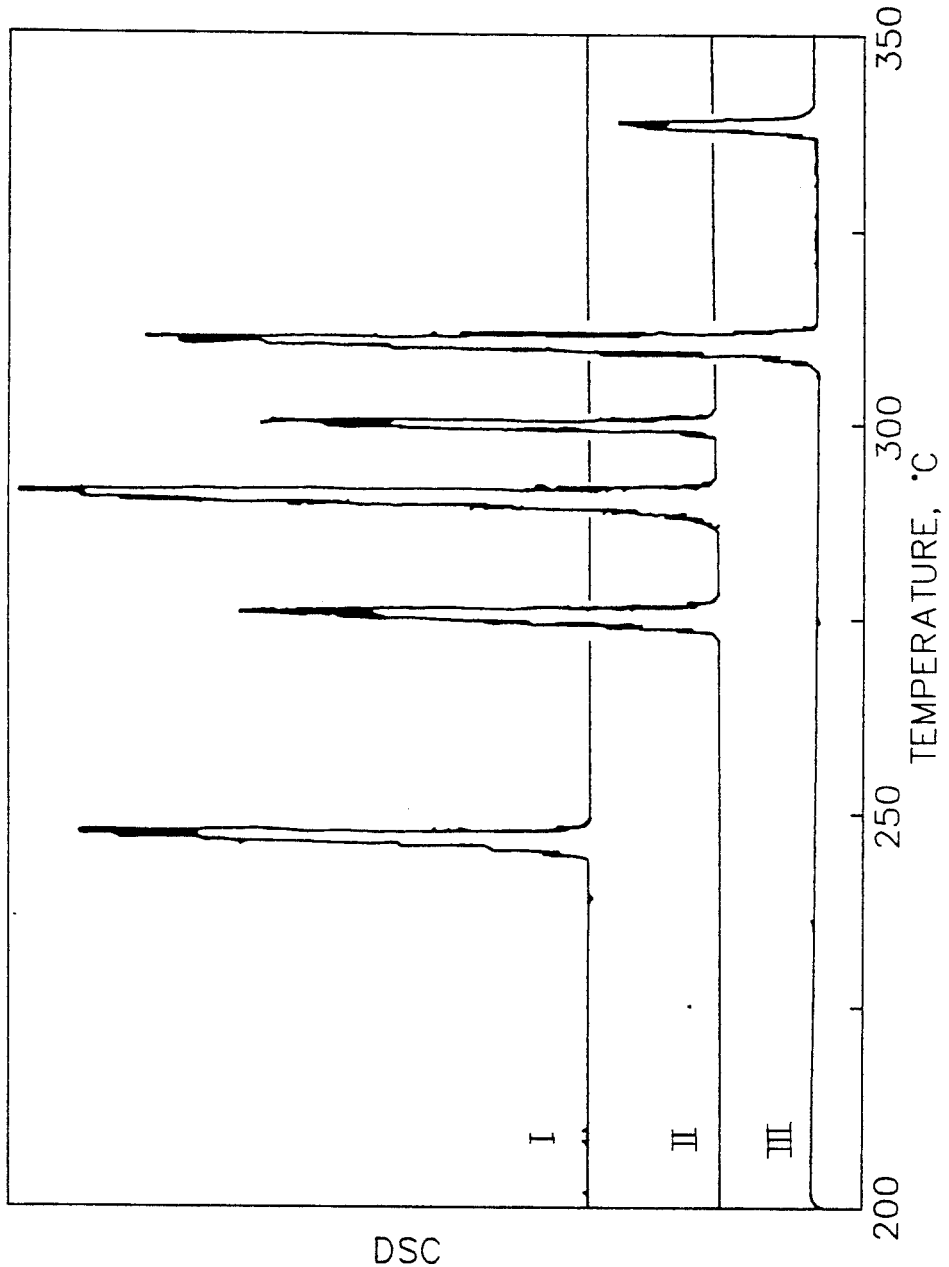
FIG. 6 is a DSC profile for 1,3-phenylene-, 2,5-thiophene-, and 1,4 phenylene-based low molecular mass diamides.

Transition endotherms of the low molar mass diamides synthesized in Example 16 are shown in the results of DSC analysis in FIG. 6. The 2,5-thiophene-based diamide shows a solid state transition (271° C.) before the fusion transition. This crystal-crystal transition presumably involves terminal alkyl chain motions. Both 1,4-phenylene- and 2,5-thiophene-based diamides on melting show focal conic fan textures indicative of smectic A phases (data not shown). The thiophene diamide melts at lower temperature (285.5° C.) and shows a much narrower mesophase range (−9° C.) than the corresponding 1,4-phenylene-based diamide (305° C. and 26° (respectively), presumably due to the 148° kink angle in the thiophene unit. The 1,3-phenylene-based diamide does not show liquid crystalline behavior and melts at 248.6° C.

EXAMPLE 18

Synthesis of Poly(p-phenylene 2,5-Thiophene Diamide) (PPT'A)

1. From 2,5-thiophene diacid chloride. In a three-neck flask equipped with mechanical stirrer and nitrogen inlet 1.662 g (0.015 mole) of 1,4-phenylene diamine was dissolved in a mixture of 39 mL of hexamethylphosphoramide (HMPA) and 10 mL of N-methyl-2-pyrrolydone (NMP). The solution was cooled with an ice-acetone bath (T=−15° C.), and to this 3.135 g of powdered 2,5-thiophene diacid chloride was added and quantitatively transferred by rinsing with 10 mL of previously cooled NMP. The mixture was stirred rapidly. After 30–40 minutes the reaction mixture became a yellow transparent liquid. The ice-acetone bath was removed and stirring was continued overnight. Stir opalescence was observed in the reaction mixture. The resultant poly(aramide) solution rapidly forms a gel upon heating to 40°–50° C., or at ambient temperature on contact with air.

The PPT'A polymer was isolated by pouring the reaction solution into 500 mL of water-methanol (1:1 vol) mixture. After thorough washing in a blender and drying, the polymer weighed 3.59 g (98%). The inherent viscosity of the thiophene-based aromatic polyamide PPT'A was 0.90 dL/g, measured at a concentration of 0.5 g/dL in concentrated sulfuric acid at 25° C.

2. From 2,5-thiophene diacid (Phosphorylation reaction). A 250 mL three neck flask fitted with a condenser, mechanical stirrer, and an inlet and outlet for nitrogen gas, was placed in an oil bath kept at 115° C. To remove air and traces of moisture, the flask was flashed with a stream of nitrogen gas. To the prepared reaction vessel were added 0.005 mol (0.86 g) of 2,5-thiophene diacid, 0.005 mol (0.54 g) of p-phenylene diamine, and the solvent medium consisting of 50 mL N-methyl-2-pyrrolidone, 10 mL pyridine, 3 g $CaCl_2$ and 1 g LiCl. The reaction mixture was stirred for 10 min and then 0.01 mole (3.1 g) of triphenyl-phosphate was added. After 2.5 hours the reaction mixture was worked up by grinding the gel with 50/50 vol water-methanol mixture in a blender, then filtering. The polymer was washed with methanol and acetone and dried for 24 hours in a vacuum oven at 80° C. Polymer yield was quantitative. The inherent viscosity was 2.05 dL/g.

During each reaction of this Example stir opalescence was observed in the reaction mixture at the late stages of polymerization. This is a coarse indicator of lyotropic mesomorphism. More direct evidence that the polymer solution is liquid crystalline comes from polarizing microscopy. When a gel of PPT'A in the mixed solvent HMPA/NMP is heated to 130° C. it melts into a birefringent fluid solution exhibiting a classical nematic schlierin texture; thus, the introduction of the 148° kink into the backbone of the polyamide PPT'A does not reduce its persistence length below the critical value needed for lyotropic mesomorphism.

EXAMPLE 19

Characterization of PPT'A

200 MHz (Bruker-200) proton and $13_c$ nuclear magnetic resonance spectroscopy was used to confirm the structure of the low molecular mass diamides and 2,5-thiophene-based polyamide. The transition temperatures and thermogravimetric characterizations were carried out with Perkin Elmer DSC-7 and TGS-4. The mesophases were identified with a Nikon polarizing microscope fitted with a Linkam hot stage. The inherent viscosity values were determined at 25° C. in 0.5 g/100 mL solutions with concentrated sulfuric acid as the solvent in a Cannon-Ubbelohde viscometer.

The inherent viscosity of polyamide prepared by the first experimental method of Example 19 was not high enough (0.90 dL/g) to produce good quality fibers. On the other hand, 2,5-thiophene diacid is a very stable compound and may be used as a monomer in the phosphorylation reaction to obtain polyamide with an inherent viscosity (2.05 dL/g) which is sufficient to produce good quality fibers.

Figure 7:
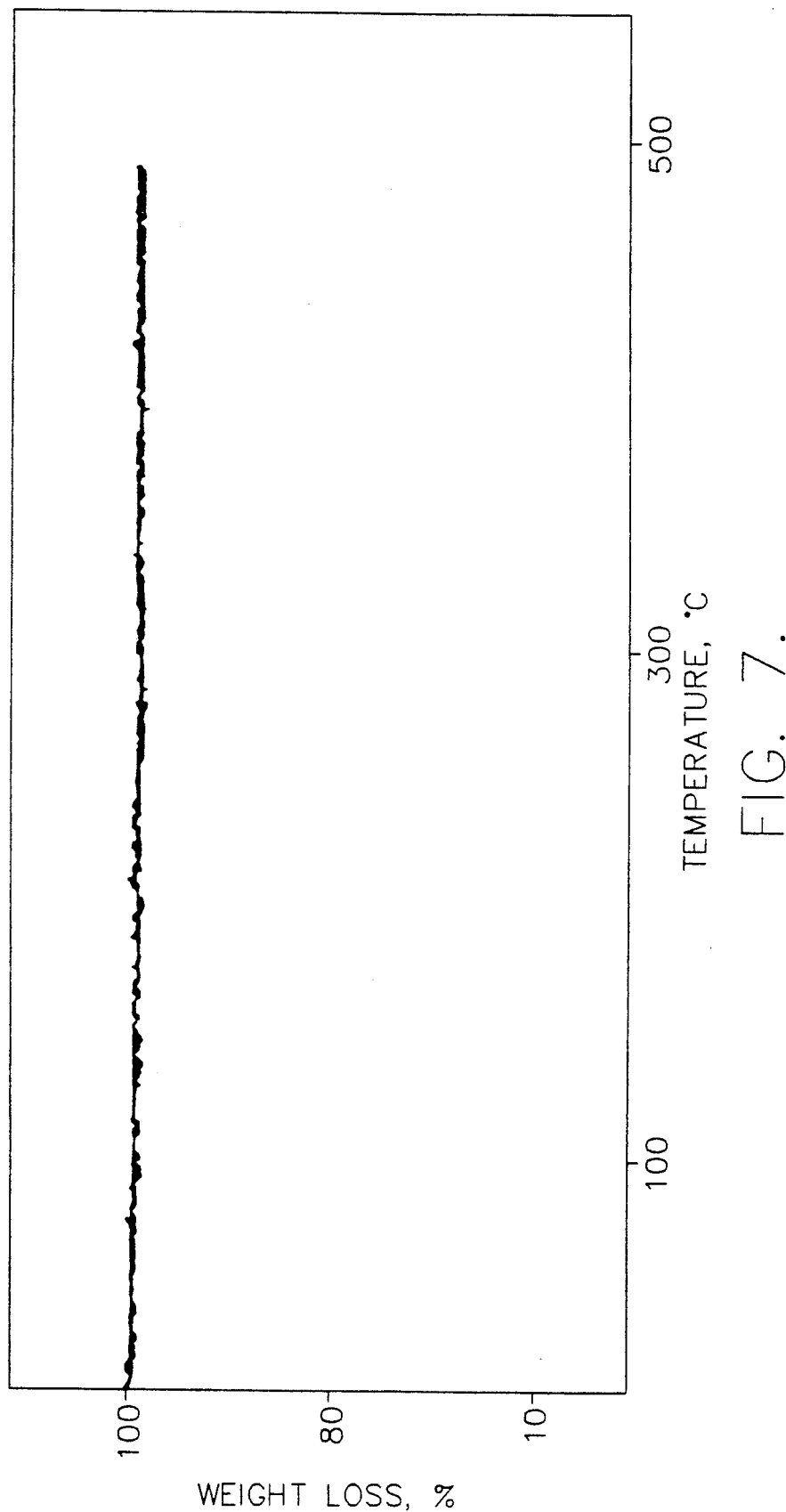
FIG. 7 is a TGA spectrum for a polyamide formed from 1,4-benzenediamine and 2,5-thiophene diacid chloride.

The thermogravimetric analyses of PPT'A in air and in helium showed that it exhibits comparable thermal and thermooxidative stability to poly(p-phenylene terephthalamide) (FIG. 7).

The foregoing examples are intended to be illustrative only and are not intended to be limiting thereof. The scope of the invention is defined by the following claims, with equivalents to be included therein.

That which is claimed is:

1. An aromatic polyamide comprising repeating linked units of the formula:

$$—[AB]— \qquad (II)$$

wherein A comprises an aromatic diamine unit, said aromatic diamine unit terminating at each end with amine groups;

wherein B comprises an aromatic dicarbonyl unit containing at least one thiophene ring, said aromatic unit terminating at each end with carbonyl groups; and wherein A and B are linked by an amide linkage.

2. An aromatic polyamide according to claim 1 which forms a mesophase in the melt.

3. An aromatic polyamide according to claim 1 which dissolves in solvents selected from the group consisting of sulfuric acid and N-methyl pyrilididone.

4. An aromatic polyamide according to claim 1, wherein A comprises 1,4-diaminobenzene.

5. An aromatic polyamide according to claim 1, wherein A comprises 4,4'-diamino-biphenyl.

6. An aromatic polyamide according to claim 1, wherein B comprises 2,5-dicarbonyl-thiophene.

7. An aromatic polyamide according to claim 1, wherein B comprises 2,5-(4-benzoyl) thiophene diamide.

8. An aromatic polyamide according to claim 1, wherein said polyamide is a copolymer further comprising aromatic dicarbonyl units consisting of carbon, nitrogen, and oxygen atoms, said aromatic dicarbonyl units terminating at each thereof with carbonyl groups, and said aromatic dicarbonyl groups being linked at each end to said aromatic diamine units by an amide linkage.

9. A polymeric film manufactured partially or entirely form the melt of a polyamide according to claim 1.

10. A polymeric fiber manufactured partially or entirely from the melt of a polyamide according to claim 1.

11. A fiber formed from a polyamide according to claim 1.

12. A resin suitable for forming molded articles comprising the polyamide of claim 1.

13. A composite comprising the polyamide of claim 1 adhered to a substrate.

14. A composite according to claim 13, wherein said polyamide comprises the matrix component of a composite material, and wherein said substrate comprises an organic or inorganic filler.

15. A film formed from a polyamide according to claim 1.

* * * * *

UNITED STATES PATENT AND TRADEMARK OFFICE
CERTIFICATE OF CORRECTION

PATENT NO. : 5,266,677
DATED : November 30, 1993
INVENTOR(S) : Edward T. Samulski It is certified that error appears in the above-indentified patent and that said Letters Patent is hereby corrected as shown below:

On the title page, Item [19] "Samulski et al" should read —Samulski—
Item [75] delete "Joseph M. DeSimone"

Column 2, Line 39, correct "148" to read --148°--.

Column 2, Line 42, correct "120" to read --120°--.

Column 2, Line 43, correct "148" to read --148°--.

Column 7, Line 57, correct ".C" to read --°C--.

Signed and Sealed this

Thirty-first Day of May, 1994

Attest:

BRUCE LEHMAN

*Attesting Officer*     *Commissioner of Patents and Trademarks*